United States Patent Office 3,583,880
Patented June 8, 1971

3,583,880
METHOD FOR TREATING INORGANIC MATERIALS
Rolf Moren, Alfredshem, and Nils-Erik Ydren, Norrkoping, Sweden, assignors to Mo & Domsjo Aktiebolag, Ornskoldsvik, and Skanska Cementaktiebolaget, Malmo, Sweden
No Drawing. Filed June 18, 1968, Ser. No. 737,799
Claims priority, application Sweden, June 20, 1967, 8,774/67
Int. Cl. C04b 41/28
U.S. Cl. 117—54
10 Claims

ABSTRACT OF THE DISCLOSURE

This specification is concerned with treating inorganic materials containing capillaries and/or gel pores with a water-soluble hygroscopic organic compound in order to reduce the degree of shrinkage.

---

The dimensional changes occurring in inorganic building materials are normally of small magnitude, i.e., approximately in the order of 0.4 part per thousand, but they are, nevertheless, of extreme importance. The changes in dimensions of such a material are caused by variations in the moisture content and temperature of the surroundings and the material. This gives rise to internal and external stresses which may result in formation of cracks and deformation. The movements take place for both short and long periods of time and reversibly within certain limits. In the majority of cases the largest changes in the dimensions of the material take place during the early life of the structure.

These dimensional changes represent a serious technical problem which inhibits the development of building and construction technique in many respects. This is not only applicable to the danger of crack formation with the accompanying danger of leaks in the structure and corrosion of reinforcing materials, but is also applicable to other problems, such as the development in prestressed concrete of the stress conditions as time goes on. The creeping of the material also plays an important part in this respect, and this factor is directly correlated with shrinkage. As another example of the disadvantages associated with shrinkage it can be mentioned that in extreme cases concrete floors cannot at present be cast in pieces greater than approximately two times two meters, owing to the risk of crack formation.

Intensive work has been carried out for many years in an attempt to obtain an effective solution of the shrinkage problem. These attempts include different alternatives, such as varying the properties of the cement, varying the method of manufacture when producing the concrete and varying the composition of the ballast material. However, none of these attempts has resulted in a satisfactory solution.

It has now been discovered that the aforementioned disadvantages can be eliminated by using a special kind of surface treatment in such a manner that dimensional movements of the material are substantially reduced or prevented entirely. Thus, in accordance with one embodiment of this invention, an inorganic material containing capillaries and/or gel pores, for instance different types of artificial stones, such as concrete, gas concrete on the basis of lime or cement as binding medium, calcareous sandstone, Sorel's cement, etc., is surface treated with a water-soluble hygroscopic organic compound which is liquid at 30° C. and which is selected from the group consisting of alcohols containing 2–3 hydroxyl groups or monoalkyl ethers thereof and amino alcohols containing 1–3 hydroxyl groups and 2–6 carbon atoms.

The organic compound should have a molecular weight of 60–650, a hygroscopicity of no less than 35% in comparison with glycerol, and a vapor pressure lower than 50 mm. Hg at 100° C. Suitable alcohols and alcohol monoalkyl ethers, among others, are glycerol, ethylene glycol, diethylene glycol and triethylene glycol; diethylene glycol-monoalkyl ethers, such as diethylene glycol-monomethyl ether, diethylene glycol-monoethyl ether; dipropylene glycol-monoalkyl ethers, such as dipropylene glycol-monomethyl ether and dipropylene glycol-monoethyl ether; propylene glycol, dipropylene glycol and tripropylene glycol; polyethylene glycols having the molecular weight 106–650; and polypropylene glycols having the molecular weight 134–650. Suitable amino alcohols which can be used according to the invention, among others, are monoethanol amine, diethanolamine, diisopropanol amine and triethanol amine. It is also possible to use mixtures of two or more of the aforementioned organic compounds.

The quantity of the hygroscopic substance applied may be varied according to the degree of stabilization desired and the porosity of the treated material and its ability to absorb treatment fluid. It can be mentioned, however, as a guide that it is normally applied in such quantities that the inorganic material absorbs at least 75 grams, preferably at least 100 grams, per square meter of the treated surface of the hygroscopic substance. Although no complete explanation of the advantageous effect afforded by the present invention can be given at present, it is possible that the application of hygroscopic substances according to the present invention in the aforementioned quantities creates some form of barrier in the surface layer of the material, which counteracts dimensional changes in the material as a whole, with accompanying shrinkages and swelling, whereby stabilization is attained. This barrier effect would seem to be partially correlated with the moisture stabilizing effect of the hygroscopic substance, and partially as a result of other factors still unknown. It has been discovered during tests carried out on concrete that in certain instances barrier properties are already obtained at a penetration depth of 0.5 mm. from the surface, at the aforedisclosed treatment quantities.

The inorganic material can be treated with the hygroscopic substance when manufacturing the artificial product on the building site or in the factory, in connection with or immediately subsequent to its manufacture. It is also possible to stabilize older artificial stone materials by treating the structure in accordance with the invention so that considerably smaller stresses and a much lower risk of crack formation is obtained as compared with the untreated material. The method of surface treating according to the invention can be varied within wide limits. For instance, after forming the artificial stone it can be immersed in the treatment liquid for a certain period of time, e.g., from 1–48 hours at a temperature of approximately 20° C. The treatment period according to this method can be substantially reduced if the immersion process is performed at temperatures of approximately 40–100° C. whereby if the material from which the artificial stone is made is, for instance, concrete, an accelerated hardening is obtained at the same time. If desired, the immersion process can be combined with the use of a vacuum and/or pressure for the purpose of increasing and hastening the penetration of the treatment fluid into the material. Alternatively, subsequent to the stone having been formed on the construction site and dried to a suitable degree, the treatment liquid may be applied by brush, roller or spray. This latter method is quick, and can be used when treating large surfaces which are difficult to immerse in the liquid. Subsequent to being applied to the treated surface, the treatment liquid also serves to retain moisture, and the practice of placing sacks, sheets of material, etc., on the stone surface is rendered unnecessary. With regard to the manufacture of steam cured concrete products at temperatures of 40–100° C. and even higher temperatures under pressure in an autoclave, further advantages can be obtained by applying cold treatment liquid, e.g., using immersion or spray methods. Thus, the improved penetration is obtained at high temperatures without it being necessary to heat the object or the treatment liquid, while at the same time, the material upon cooling tends to suck up the liquid which further improves the degree of penetration. The methods in which the treatment liquid is applied to the object may obviously be varied in other ways, within the scope of the invention provided that the active substance in the treatment liquid is absorbed to such an extent that the aforementioned barrier effect is obtained.

The treatment liquid may contain the hygroscopic substance or substances in pure, concentrated form. A solvent, such as water and/or suitable organic solvents, may be added in amounts up to those which equal the quantity of hygroscopic substance. Minor quantities of optional substances may be added, such as wetting agents which increase the degree of absorption and the absorption rate still further. Substances, which promote the retention of the active substance in the surface layer of the inorganic material, may be added, e.g., water-soluble polyalkylene glycols having molecular weights of 650–6000, or water-soluble curing synthetic resins of the type melamine-formaldehyde, carbamide-formaldehyde and phenol-formaldehyde. Suitable surface active materials may be added, for instance, alkyl phenol-ethylene-oxide adducts and fatty alcohol sulphates. The treatment liquid used in the method according to the invention may be provided with minor quantities of thickening agent, e.g., water-soluble cellulose derivatives, polyvinyl alcohols and polyvinyl acetate, to prevent the treatment liquid from running off from the treated object before it has been able to penetrate the surface. The treatment liquid may also be provided with anticorrosion, e.g., benzoic acid, and fungicidal substances although several of the active hygroscopic substances themselves may have these properties.

Thus, in accordance with this invention, it is now possible to reduce the shrinkage in certain inorganic materials. For instance, in concrete it is reduced from normally about 0.4 part per thousand to values below 0.1 part per thousand, i.e., reduced by at least about 75%. In certain instances, it is even possible to eliminate shrinkage completely.

The following examples are submitted to illustrate but not to limit this invention. Unless otherwise indicated all parts and percentages in the specification and claims are based upon weight.

EXAMPLE I

Test samples, 10 x 10 x 40 cms. in dimension, were manufactured from a concrete containing 300 kg. of cement per m.$^3$ and with a water-cement number of 0.50. A standard ballast containing gravel and macadam was used as ballast material. The concrete had the following composition:

| Ingredients: | Parts by wt. |
|---|---|
| Cement | 1.00 |
| Gravel (particle size 0.0–5.6 mm.) | 2.85 |
| Macadam (particle size 8–16 mm.) | 1.76 |
| Macadam (particle size 16–32 mm.) | 1.76 |

The samples, which were in molds for 24 hours, were removed. They were then treated as shown in Table 1 with a hygroscopic substance in an 80% aqueous solution by immersion at various temperatures for different periods of time and in several instances in combination with a vacuum and/or pressure. Subsequent to this treatment, the samples were stored at 65% relative humidity at 20° C. for periods of time varying up to 1 year.

The results are indicated in Table 1.

TABLE 1

| Hygroscopic compound | Quantity of active substance absorbed (g./m.$^2$) | Treatment temp. (° C.) | Immersion time (hours) | Shrinkage O-test, parts per thousand | Treatment,$^x$ parts per thousand | Shrinkage reduction (percent) |
|---|---|---|---|---|---|---|
| Diethylene glycol monoethylether | 280 | 20 | 24 | [1] 0.09 | 0.04 | 55 |
|  | 280 | 20 | 24 | [2] 0.15 | 0.08 | 46 |
|  | 280 | 20 | 24 | [3] 0.29 | 0.20 | 31 |
|  | 225 | 60 | 6 | [1] 0.09 | 0.01 | 88 |
|  | 225 | 60 | 6 | [2] 0.15 | 0.04 | 74 |
|  | 225 | 60 | 6 | [3] 0.29 | 0.14 | 52 |
|  | 260 | 60 | 12 | [1] 0.09 | 0.03 | 67 |
|  | 260 | 60 | 12 | [2] 0.15 | 0.04 | 73 |
|  | 260 | 60 | 12 | [3] 0.29 | 0.09 | 69 |
| Polyethylene glycol (molecular weight 200) | 168 | 20 | 24 | [1] 0.10 | 0.08 | 20 |
|  | 168 | 20 | 24 | [2] 0.25 | 0.14 | 44 |
|  | 168 | 20 | 24 | [3] 0.31 | 0.23 | 26 |
|  | 168 | 20 | 24 | [4] 0.41 | 0.30 | 27 |
|  | 168 | 20 | 24 | [5] 0.41 | 0.30 | 27 |
|  | 140 | 60 | 6 | [1] 0.10 | 0.03 | 70 |
|  | 140 | 60 | 6 | [2] 0.25 | 0.09 | 64 |
|  | 140 | 60 | 6 | [3] 0.31 | 0.18 | 42 |
|  | 140 | 60 | 6 | [4] 0.41 | 0.24 | 42 |
|  | 140 | 60 | 6 | [5] 0.41 | 0.24 | 42 |
|  | 152 | 60 | 12 | [1] 0.09 | 0.02 | 78 |
|  | 152 | 60 | 12 | [2] 0.15 | 0.03 | 80 |
|  | 152 | 60 | 12 | [3] 0.29 | 0.11 | 62 |
| Polyethylene glycol (molecular weight 200, beam length 30 mm.) | 600 | $^a$ 20 | | [1] 0.09 | 0.00 | 100 |
|  | 600 | 20 | | [2] 0.15 | 0.00 | 100 |
|  | 600 | 20 | | [3] 0.29 | 0.00 | 100 |
| Ethylene glycol | 176 | 20 | 24 | [1] 0.09 | 0.06 | 33 |
|  | 176 | 20 | 24 | [2] 0.15 | 0.16 | 6 |
|  | 176 | 20 | 24 | [3] 0.29 | 0.26 | 11 |
|  | 248 | 60 | 12 | [1] 0.09 | 0.00 | 100 |
|  | 248 | 60 | 12 | [2] 0.15 | 0.04 | 73 |
|  | 248 | 60 | 12 | [3] 0.29 | 0.13 | 55 |
| Propylene glycol | 340 | 20 | 24 | [1] 0.09 | 0.03 | 67 |
|  | 340 | 20 | 24 | [2] 0.15 | 0.11 | 27 |
|  | 340 | 20 | 24 | [3] 0.29 | 0.23 | 21 |
|  | 212 | 60 | 12 | [1] 0.09 | 0.02 | 78 |
|  | 212 | 60 | 12 | [2] 0.15 | 0.08 | 46 |
|  | 212 | 60 | 12 | [3] 0.29 | 0.16 | 45 |
| Triethanolamine | 128 | 20 | 24 | [1] 0.09 | 0.05 | 45 |
|  | 76 | 60 | 6 | [2] 0.09 | 0.06 | 33 |
|  | 76 | 60 | 12 | [3] 0.09 | 0.05 | 45 |

$^a$ Vacuum: 85%, 0.5 hr.; over pressure: 8 atm., 2 hrs.

$^x$ Saturated after a storage time of: [1]=1 week; [2]=1 month; [3]=3 months; [4]=4 months; [5]=1 year.

This example demonstrates that there was a reduction in shrinkage by employing the method in this invention. In certain instances there was no shrinkage at all.

EXAMPLE II

Test samples of gas concrete, 100 x 100 x 450 mm. in size, were cut out of a factory produced gas concrete rod and treated according to Table 2 herebelow.

TABLE 2

| Sample | Treatment | Shrinkage, parts per thousand | Shrinkage reduction (percent) |
|---|---|---|---|
| A | Untreated sample dried in furnace 14 days at 50° C. and conditioned 1 day at 20° C. and 65% relative humidity. | 0.48 | |
| B | Sample immersed in 80% polyethylene glycol having a molecular weight 200, for 5 minutes at a temperature of 20° C., dried in a furnace for 14 days at 50° C. and conditioned 1 day at 20° C. and 65% relative humidity. | 0.19 | 60 |

The superiority of the method of the present invention is evident in this example.

Having set forth the general nature and specific embodiments of the present invention, the true scope is now particularly pointed out in the appended claims.

What is claimed is:

1. A method for reducing the shrinkage of artificial stone containing capillaries or gel pores which comprises surface treating previously formed artificial stone with a composition consisting essentially of a water-soluble hygroscopic substance having a concentration from 50 to 100% by weight consisting essentially of ethylene glycol, diethylene glycol, polyethylene glycols having molecular weights of 106–650, propylene glycol, dipropylene glycol, polypropylene glycols having molecular weights of 134–650, diethylene glycol-monoalkyl ethers, dipropylene glycol-monoalkyl ethers, glycerol, monoethanol amine, diethanol amine, triethanol amine, diisopropanol amine and mixtures thereof in an amount sufficient to penetrate the surface at a depth of at least 0.5 mm.

2. The method according to claim 1 wherein the water-soluble hygroscopic substance is applied in such quantities that the inorganic material absorbs at least 75 grams per square meter of its surface of the water-soluble hygroscopic substance.

3. The method according to claim 1 wherein the surface treatment is carried out by coating.

4. The method according to claim 1 wherein the surface treatment is performed at a temperature of 40–80° C.

5. The method according to claim 1 in which the artificial stone is brought to a temperature of 40–120° C. before being treated.

6. The method according to claim 1 in which the artificial stone is selected from the group consisting of concrete, gas concrete, calcareous sandstone and Sorel's cement.

7. The method according to claim 1 in which the water-soluble hygroscopic substance is polyethylene glycol having a molecular weight of 106–650.

8. The method according to claim 1 in which the treatment liquid also contains a surface active substance.

9. The method according to claim 1 in which the treatment liquid also contains a synthetic resin.

10. The method according to claim 1 in which the treatment liquid also contains an anti-corrosion substance.

References Cited
UNITED STATES PATENTS

| | | | |
|---|---|---|---|
| 1,965,646 | 7/1934 | Ihrig | 117—54X |
| 2,288,633 | 7/1942 | Luckhaupt | 106—12X |
| 2,575,599 | 11/1951 | Silverman et al. | 106—12 |
| 3,250,833 | 5/1966 | Wagner | 264—133X |

RALPH S. KENDALL, Primary Examiner

U.S. Cl. X.R.

117—123